United States Patent
Alt et al.

(10) Patent No.: US 11,613,368 B2
(45) Date of Patent: Mar. 28, 2023

(54) AIRCRAFT WITH ELECTRICAL ENERGY STORAGE IN NACELLES

(71) Applicant: Rolls-Royce Corporation, Indianapolis, IN (US)

(72) Inventors: John Timothy Alt, Greenwood, IN (US); Sara Jocelyn Abruzzo, Indianapolis, IN (US); Daniel Lawrence Phelps, Fishers, IN (US); David Russell Trawick, Indianapolis, IN (US)

(73) Assignee: Rolls-Royce Corporation, Indianapolis, IN (US)

( * ) Notice: Subject to any disclaimer, the term of this patent is extended or adjusted under 35 U.S.C. 154(b) by 306 days.

(21) Appl. No.: 16/774,606

(22) Filed: Jan. 28, 2020

(65) Prior Publication Data
US 2021/0229821 A1    Jul. 29, 2021

(51) Int. Cl.
  *B64D 27/24*  (2006.01)
  *B64C 7/02*   (2006.01)
  *H02J 1/08*   (2006.01)

(52) U.S. Cl.
  CPC .............. *B64D 27/24* (2013.01); *B64C 7/02* (2013.01); *H02J 1/082* (2020.01); *B64D 2221/00* (2013.01)

(58) Field of Classification Search
  CPC ......... H02J 1/082; B64D 27/24; B64D 29/00; B64C 7/02
  See application file for complete search history.

(56) References Cited

U.S. PATENT DOCUMENTS

| | | |
|---|---|---|
| 2017/0327219 A1* | 11/2017 | Alber ............... H02S 20/00 |
| 2019/0031361 A1 | 1/2019 | McCullough et al. |
| 2019/0118957 A1 | 4/2019 | Thomassin et al. |
| 2019/0329858 A1* | 10/2019 | Bevirt ............... B64C 1/38 |
| 2020/0339010 A1* | 10/2020 | Villanueva ........ H01M 10/6552 |

* cited by examiner

*Primary Examiner* — Timothy D Collins
*Assistant Examiner* — Justin Michael Heston
(74) *Attorney, Agent, or Firm* — Shumaker & Sieffert, P.A.

(57) ABSTRACT

An example system includes a first plurality of nacelles located on a first side of an aircraft, wherein each nacelle of the first plurality of nacelles includes an electric motor coupled to a propulsor, wherein an outboard nacelle of the first plurality of nacelles includes an electrical energy storage system (ESS) coupled to a first electrical bus; and a second plurality of nacelles located on a second side of the aircraft, wherein each nacelle of the second plurality of nacelles includes an electric motor coupled to a propulsor, wherein an outboard nacelle of the second plurality of nacelles includes an ESS coupled to a second electrical bus.

20 Claims, 2 Drawing Sheets

US 11,613,368 B2

AIRCRAFT WITH ELECTRICAL ENERGY STORAGE IN NACELLES

TECHNICAL FIELD

This disclosure relates to aircraft electric or hybrid-electric propulsion systems.

BACKGROUND

Aircraft may be powered by various propulsors (e.g., fans or propellers), which may be driven by various motors. In electric aircraft, an electric motor may drive the propulsors using electrical energy sourced from an electrical energy storage system (ESS) that includes one or more batteries.

SUMMARY

In general, this disclosure describes aircraft propulsion systems with electrical energy storage systems (ESSs) positioned in nacelles. Components of an ESS, such as batteries, may be positioned at various locations within an aircraft. For instance, an ESS may be located in a fuselage of the aircraft. However, positioning the ESS in the fuselage may present one or more disadvantages. For instance, it may be difficult to cool and/or vent an ESS positioned in the fuselage.

In accordance with this disclosure, components of an ESS may be positioned in nacelles attached to an aircraft. For instance, as opposed to locating batteries of an ESS in the fuselage, the batteries may be positioned in nacelles attached to wings of the aircraft. With the ESS components positioned in the nacelles, the complexity of cooling and/or venting systems of the ESS components may be reduced. As one example, a length of vents needed for the ESS may be reduced. As another example, radiators of the cooling system may be located in the nacelles, proximate to the ESS components, which reduces complexity.

In some examples, an aircraft may include multiple nacelles on each side. For instance, an aircraft may include two nacelles on the port side and two nacelles on the starboard side, each of the nacelles including an electric machine coupled to a propulsor. In some of such examples, the electric machines on a particular side of the aircraft may operate using electrical energy provided by an ESS having components located in nacelles on the particular side of the aircraft. For instance, electric machines located in starboard nacelles may operate using electrical energy provided by a first ESS with components located in the starboard nacelles and electric machines located in port nacelles may operate using electrical energy provided by a second ESS with components located in the port nacelles. However, in such examples (i.e., where the electric machines on a particular side of the aircraft operate using electrical energy provided by an ESS having components located in nacelles on the particular side of the aircraft), failure of an ESS on a particular side of the aircraft may result in the electric machines on the particular side ceasing to receive electrical energy, thus ceasing to provide propulsive force. A cessation in propulsive force on the particular side may result in a significant yaw moment, which may impair the controllability of the aircraft.

In accordance with this disclosure, electric machines symmetrically distributed across an airframe may be grouped to operate using electrical energy from ESSs. For instance, an electric machine included in an inboard nacelle on a first side and an electric machine included in an inboard nacelle on a second side may both operate using electrical energy provided by an ESS on the first side, and an electric machine included in an outboard nacelle on the first side and an electric machine included in an outboard nacelle on the second side may both operate using electrical energy provided by an ESS on the second side. As such, a failure in either the ESS on the first side or the ESS on the second side will not introduce a yaw moment due to asymmetrical thrust in the aircraft.

In one example, a system includes a first plurality of nacelles located on a first side of an aircraft, wherein each nacelle of the first plurality of nacelles includes an electric motor coupled to a propulsor, wherein an outboard nacelle of the first plurality of nacelles includes an electrical energy storage system (ESS) coupled to a first electrical bus; and a second plurality of nacelles located on a second side of the aircraft, wherein each nacelle of the second plurality of nacelles includes an electric motor coupled to a propulsor, wherein an outboard nacelle of the second plurality of nacelles includes an ESS coupled to a second electrical bus; wherein an electric motor of the outboard nacelle of the first plurality of nacelles and an electric motor of the outboard nacelle of the second plurality of nacelles are configured to operate using electrical energy from the first electrical bus, and wherein an electric motor of an inboard nacelle of the first plurality of nacelles and an electric motor of an inboard nacelle of the second plurality of nacelles are configured to operate using electrical energy from the second electrical bus.

The details of one or more examples are set forth in the accompanying drawings and the description below. Other features, objects, and advantages will be apparent from the description and drawings, and from the claims.

DETAILED DESCRIPTION

Figure 1:
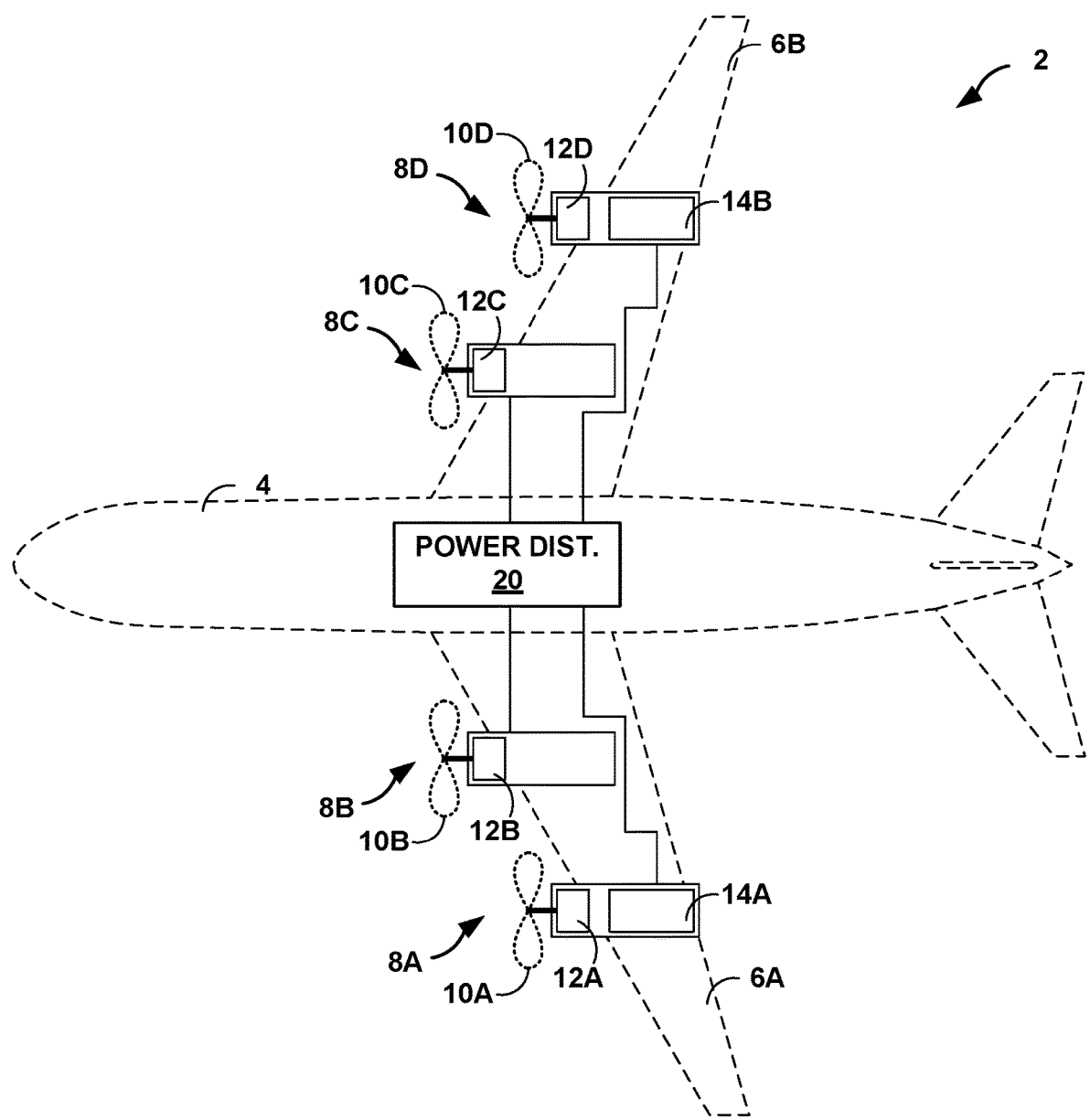
FIG. 1 is a conceptual block diagram illustrating an aircraft that includes fault tolerant electrical propulsion system, in accordance with one or more aspects of this disclosure.

FIG. 1 is a conceptual block diagram illustrating an aircraft that includes fault tolerant electrical propulsion system, in accordance with one or more aspects of this disclosure. As shown in FIG. 1, aircraft 2 includes fuselage 4, port wing 6A, starboard wing 6B, nacelles 8A-8D (collectively, "nacelles 8"), and electrical energy storage systems (ESSs) 14A and 14B. Examples of aircraft 2 include, but are not limited to, fixed wing airplanes, tilt rotor aircraft, rotorcraft (e.g., helicopters, quadcopters, etc.), or any other flying machine propelled at least in part using electrically driven propulsors. Fuselage 4 may be a main body of aircraft 2 in which passengers and/or cargo are stored.

Nacelles 8 may include various components to support operation of aircraft 2. Nacelles 8 may be distributed on both port and starboard sides of aircraft 2. For instance, as shown in FIG. 1, nacelles 8A and 8B may be positioned on a port side of aircraft 2 (e.g., attached to port wing 6A) and nacelles 8C and 8D may be positioned on a starboard side of aircraft 2 (e.g., attached to starboard wing 6B). Nacelles 8 may be referred to by relative position. For instance, nacelles 8B and 8C may be referred to as inboard nacelles (e.g., as they are located closer to fuselage 4 than nacelles 8A and 8D). Similarly, nacelles 8A and 8D may be referred to as outboard nacelles (e.g., as they are located farther from fuselage 4 than nacelles 8B and 8C).

One or more of nacelles 8 may include propulsors configured to propel aircraft 2. For instance, as shown in FIG. 1, each of nacelles 8 may include a respective propulsor of propulsors 10A-10D (collectively, "propulsors 10") that is driven by a respective electric motor of electric motors 12A-12D (collectively, "electric motors 12"). Examples of propulsors 10 include, but are not limited to, fans, propellers (e.g., either fixed or variable pitch), and the like. Examples of electric motors 12 include, but are not limited to, brushed, brushless, alternating current (AC), direct current (DC), field-wound, permanent magnet, etc. Electric motors 12 may provide rotational energy to propulsors 10 using electrical energy source from one or more components of aircraft 2, such as ESS 14A or ESS 14B.

Aircraft 2 may include a plurality of electrical energy storage systems, such as ESS 14A and ESS 14B (collectively, "ESSs 14"). The ESSs 14 may be configured to store electrical energy for use by one or more components of aircraft 2, such as electric motors 12. Each of ESSs 14 may be connected to a respective electrical bus of a plurality of electrical busses. For instance, ESS 14A may be connected to, and configured to supply electrical energy to, a first electrical bus. Similarly, ESS 14B may be connected to, and configured to supply electrical energy to, a second electrical bus.

In accordance with one or more aspects of this disclosure, ESSs 14 and electric motors 12 may be connected to electrical busses of the plurality of electrical busses such that a failure of a particular ESS of ESSs 14 will not introduce a significant yaw moment in aircraft 2. For instance, the electric motors included in the outboard nacelles (e.g., electric motors 12A and 12D) may be coupled to a first electrical bus supplied by a first ESS (e.g., ESS 14A) and the electric motors included in the inboard nacelles (e.g., electric motors 12B and 12C) may be coupled to a second electrical bus supplied by a second ESS (e.g., ESS 14B). In such an arrangement, a failure of the first ESS will result in the electric motors of the outboard nacelles ceasing to provide propulsive force while the electric motors of the inboard nacelles continue to provide propulsive force (e.g., using energy from the second ESS). Similarly, a failure of the second ESS will result in the electric motors of the inboard nacelles ceasing to provide propulsive force while the electric motors of the outboard nacelles continue to provide propulsive force (e.g., using energy from the first ESS). In either case, the provided propulsive force will still be symmetrical, thus no significant yaw moment will be introduced.

Aircraft 2 may include protection and distribution components 20 ("PnD 20") that form portions of the electrical busses. PnD 20 may include various distribution panels and electrical cables that facilitate the transfer of electrical energy between components of aircraft 2 (e.g., electric motors 12 and ESSs 14). As one example, PnD 20 may include a first distribution panel for the first electrical bus and a second distribution panel for the second electrical bus. The first and second distribution panels may be located in fuselage 4.

As another example, PnD 20 may include several electrical cables. For instance, PnD 20 may include electrical cables connecting ESSs 14 to the distribution panels, and electrical cables connecting the distribution panels to electric motors 12. As such, in some examples, all of the electrical energy provided by ESSs 14 and utilized by electric motors 12 may flow through the distribution panels.

Figure 2:
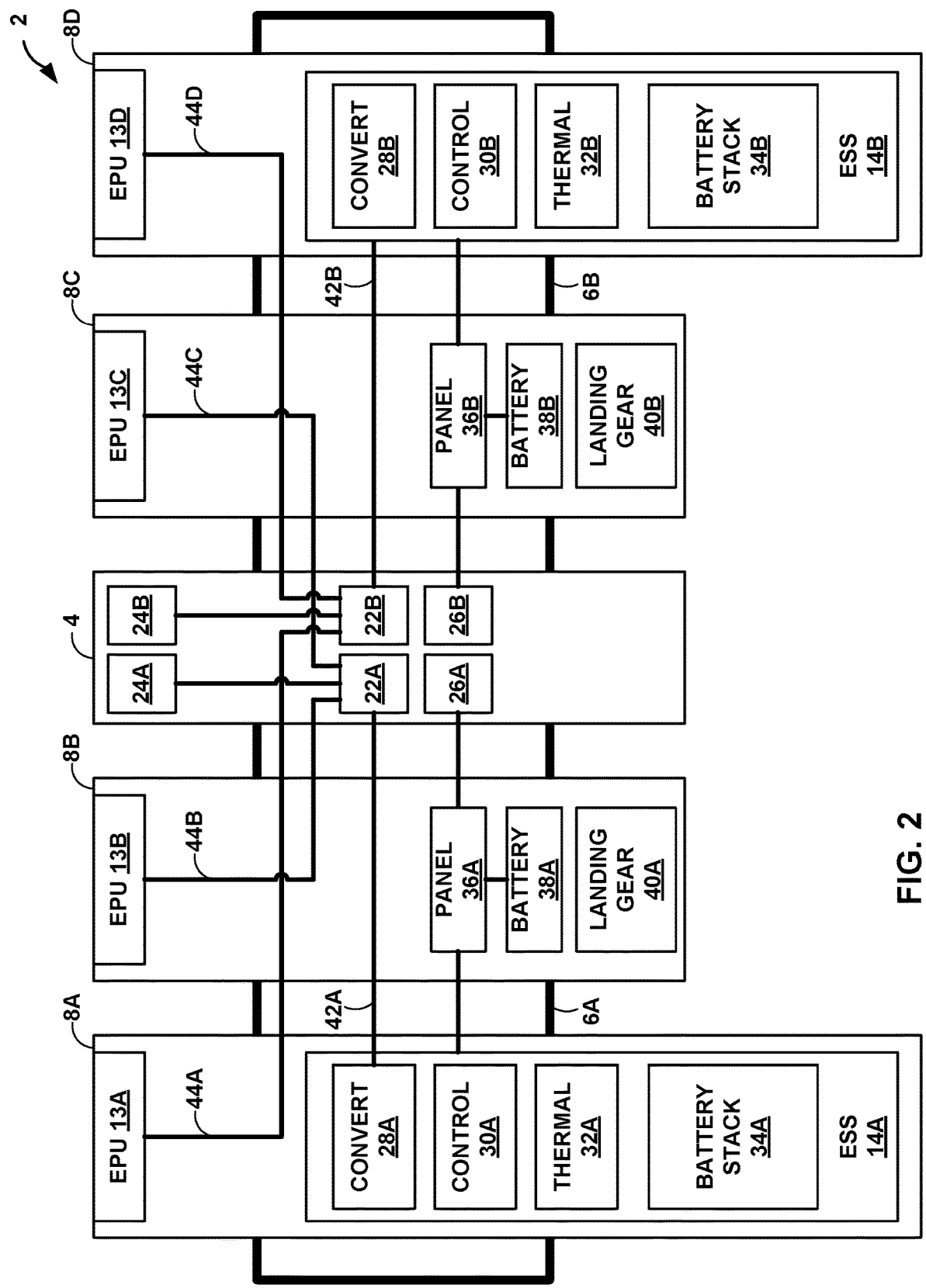
FIG. 2 is a conceptual block diagram illustrating a system that includes a hybrid propulsion system in a series configuration, in accordance with one or more techniques of this disclosure.

FIG. 2 is a system diagram illustrating further details of one example of aircraft 2 of FIG. 1, in accordance with one or more aspects of this disclosure. As shown in FIG. 2, each of nacelles 8 may include an electric propulsion unit (EPU) of EPUs 13A-13D (collectively, "EPUs 13"). Each of EPUs 13 may include components configured to propel aircraft 2 using electrical energy. For instance, each of EPUs 13 may include an electric motor and a propulsor (e.g., an electric motor of electric motors 12 and a propulsor of propulsors 10 of FIG. 1). In some examples, EPUs 13 may include additional components. For instance, where the electrical busses supplying EPUs 13 are direct current (DC) electrical busses and the electric motors are alternating current (AC) motors, EPUs 13 may each include an inverter configured to convert DC electrical energy into AC electrical energy.

ESSs 14, as shown in FIG. 2, may each include a respective converter of converters 28A and 28B (collectively, "converters 28"), a respective controller of controllers 30A and 30B (collectively, "controllers 30"), a respective thermal management system (TMS) of TMS 32A and 32B (collectively, "TMSs 32"), and a respective battery stack of battery stacks 34A and 34B (collectively, "battery stacks 34").

Converters 28 include components configured to convert electrical energy exchanged between battery stacks 34 and electrical busses. For instance, converter 28A may convert electrical energy between battery stack 34A and a first electrical bus and converter 28B may convert electrical energy between battery stack 34B and a second electrical bus. In some examples, to convert the electrical energy, converters 28 may adjust a voltage of the electrical energy. For instance, where the first electrical bus is a DC electrical bus (e.g., a 1080 volt DC electrical bus), converter 28A may include DC/DC converters configured to convert electrical energy between a voltage of battery stack 34A and a voltage of the first electrical bus. Converters 28 may be bi-directional in that converters 28 may convert electrical energy provided by battery stacks 34 for use by other components of aircraft 2 and convert electrical energy provided by other components of aircraft 2 for use in charging battery stacks 34.

Controllers 30 may be configured to control operation of ESSs 14. For instance, controller 30A may be considered a controller of a battery management system that controls operation of converter 28A, TMS 32A, and battery stack 34A.

TMSs 32 may include components configured to manage a thermal state of ESSs 14. For instance, each of TMSs 32 may include loops (e.g., heating and/or cooling) configured to manage a temperature of a corresponding ESS of ESSs 14. As one example, TMS 32A may include one or more temperature sensors configured to monitor a temperature of battery stack 34A, one or more pumps configured to pump coolant through battery stack 34A, one or more heaters configured to heat the coolant, and a controller that manages operation of the pumps and heaters based on the temperature of battery stack 34A. TMS 32B may include similar components for battery stack 34B.

Battery stacks 34 may each include a plurality of battery modules that store electrical energy to be used for propulsion of aircraft 2. The battery modules in battery stacks 34 may be any type of battery. Examples of batteries include, but are not limited to, lithium-ion, lead-acid, nickel-cadmium, nickel-metal hydride, lithium-ion polymer, or any other type of rechargeable battery (i.e., secondary cell). While illustrated in FIG. 2 as being entirely within the outboard nacelles, in some examples the batteries of battery stacks 34 may be distributed among inboard and outboard nacelles, or may be entirely within the inboard nacelles. That is, in one example, batteries of battery stack 34A may all be included in nacelle 8A and batteries of battery stack 34B may all be included in nacelle 8D. In another example, a first set of the batteries of battery stack 34A may be included in nacelle 8A, a second set of the batteries of battery stack 34A may be included in nacelle 8B, a first set of the batteries of battery stack 34B may be included in nacelle 8D, a second set of the batteries of battery stack 34B may be included in nacelle 8C. In another example, batteries of battery stack 34A may all be included in nacelle 8B and batteries of battery stack 34B may all be included in nacelle 8C.

Nacelles 8 may include one or more components configured to facilitate operation of battery stacks 34. As one example, outboard nacelles 8A and 8D may each include vents configured to transmit gasses or other particulate (e.g., smoke) from battery stacks 34 to outside of aircraft 2. As another example, outboard nacelles 8A and 8D may each include access panels that enable direct access to battery stacks 34 from outside of aircraft 2.

As discussed above, aircraft 2 may include a plurality of electrical busses. For instance, as shown in FIG. 2, aircraft 2 may include a respective propulsion bus for each ESS of ESSs 14. Each of the propulsion busses may be formed from various electrical cables and distribution panels. For instance, a first propulsion bus may be formed from cables and panels used to provide electrical energy to electric motors of outboard nacelles 8A and 8D, and a second propulsion bus may be formed from cables and panels used to provide electrical energy to electric motors of inboard nacelles 8B and 8C. As shown in FIG. 2, the first propulsion bus may include: electrical cables 42A connecting ESS 14A to distribution panel 22A, electrical cables 44B connecting distribution panel 22A to EPU 13B (e.g., to the electric motor of inboard nacelle 8B), and electrical cables 44C connecting distribution panel 22A to EPU 13C (e.g., to the electric motor of inboard nacelle 8C). Similarly, the second propulsion bus may include: electrical cables 42B connecting ESS 14B to distribution panel 22B, electrical cables 44A connecting distribution panel 22B to EPU 13A (e.g., to the electric motor of outboard nacelle 8A), and electrical cables 44D connecting distribution panel 22B to EPU 13D (e.g., to the electric motor of outboard nacelle 8D). Electric cables 44A-44D (collectively, "electric cables 44") and electric cables 42A and 42B (collectively, "electric cables 42") may be any type of electrical cable, such as stranded, solid, and the like. As shown in FIG. 2, electric cables 42 and 44 may be routed through wings 6A and 6B.

While described above and shown in FIGS. 1 and 2 as including four nacelles, the designs of this disclosure are equally applicable to aircraft that include other quantities of nacelles. For instance, an aircraft that included six nacelles may include three propulsion busses and three ESSs such that a failure of any single ESS does not result in asymmetric propulsion (e.g., a yaw moment).

Aircraft 2 may include one or more electric busses in addition to the propulsion busses. For instance, aircraft 2 may include one or more low voltage DC busses (e.g., 28 volts) that supply electrical energy to components of aircraft 2 other than propulsion motors (e.g., other than electrical motors 12). Some examples of components that may be powered via the low voltage DC busses include avionics and hotel loads (e.g., cabin lighting, cabin climate control, cooking, and the like). As shown in FIG. 2, aircraft 2 may include two non-propulsion electrical busses. Each of the non-propulsion electrical busses may include a battery, a distribution panel, and a control switch. For instance, a first non-propulsion electrical bus may include battery 38A, panel 36A, and control switch 26A. Similarly, a second non-propulsion electrical bus may include battery 38B, panel 36B, and control switch 26B. Panels 36A and 36B and batteries 38A and 38B may be included in nacelles. As shown in FIG. 2, panel 36A and battery 38A may be located in inboard nacelle 8B, and panel 36B and battery 38B may be located in inboard nacelle 8C. Control switches 26A and 26B may be located in fuselage 4 (e.g., in the cockpit). Activation of control switches 26 may result in activation (e.g., powering up) of the non-propulsion electrical busses, which may result in activation of the propulsion electrical busses. For instance, as shown in FIG. 2, ESS 14A may receive power from panel 36A and ESS 14B may receive power from panel 36B.

As shown in FIG. 2, inboard nacelles 8B and 8C may respectively include landing gear 40A and 40B. The presence of landing gear 40A and 40B in inboard nacelles 8B and 8C may reduce the space available for other components. As such, in accordance with one or more aspects of this disclosure, ESSs 14 may be included in outboard nacelles 8A and 8D. In this way, aircraft 2 may include nacelles of approximately the same size, which may improve aerodynamics and reduce manufacturing complexity.

In some examples, aircraft 2 may be a purely electrically powered aircraft. For instance, EPUs 13 may be entirely powered using electrical energy provided by ESSs 14. In other examples, aircraft 2 may be a hybrid-electric aircraft. For instance, aircraft 2 may include a combustion operated motor connected to a generator (e.g., a genset) that generates electrical energy for immediate use by EPUs 13 or for storage in ESSs 14.

Aircraft 2 may include a respective charging panel for each of the propulsion busses. For instance, as shown in FIG. 2, aircraft 2 may include charging panel 24A for the first propulsion bus and charging panel 24B for the second propulsion bus. Each of the charging panels may include components configured to enable the charging of an ESS of ESSs 14 using power sourced from outside of aircraft 2, such as ground power.

The following examples may illustrate one or more aspects of the disclosure:

Example 1. A system comprising: a first plurality of nacelles located on a first side of an aircraft, wherein each nacelle of the first plurality of nacelles includes an electric motor coupled to a propulsor, wherein an outboard nacelle of the first plurality of nacelles includes an electrical energy storage system (ESS) coupled to a first electrical bus; and a second plurality of nacelles located on a second side of the aircraft, wherein each nacelle of the second plurality of nacelles includes an electric motor coupled to a propulsor, wherein an outboard nacelle of the second plurality of nacelles includes an ESS coupled to a second electrical bus; wherein an electric motor of the outboard nacelle of the first plurality of nacelles and an electric motor of the outboard nacelle of the second plurality of nacelles are configured to operate using electrical energy from the first electrical bus, and wherein an electric motor of an inboard nacelle of the first plurality of nacelles and an electric motor of an inboard nacelle of the second plurality of nacelles are configured to operate using electrical energy from the second electrical bus.

Example 2. The system of example 1, further comprising a first distribution panel for the first electrical bus located in a fuselage of the aircraft and a second distribution panel for the second electrical bus located in the fuselage.

Example 3. The system of example 2, wherein the first electrical bus comprises: electrical cables connecting the ESS in the outboard nacelle of the first plurality of nacelles to the first distribution panel, electrical cables connecting the first distribution panel to the electric motor of the outboard nacelle of the first plurality of nacelles, and electrical cables connecting the first distribution panel to the electric motor of the outboard nacelle of the second plurality of nacelles, and wherein the second electrical bus comprises: electrical cables connecting the ESS in the outboard nacelle of the second plurality of nacelles to the second distribution panel, electrical cables connecting the second distribution panel to the electric motor of the inboard nacelle of the first plurality of nacelles, and electrical cables connecting the second distribution panel to the electric motor of the inboard nacelle of the second plurality of nacelles.

Example 4. The system of example 3, wherein the inboard nacelle of the first plurality of nacelles includes a battery connected to a third electrical bus, and the inboard nacelle of the second plurality of nacelles includes a battery connected to fourth electrical bus.

Example 5. The system of example 4, wherein the first electrical bus and the second electrical bus are high voltage direct current (DC) electrical busses, and wherein the third electrical bus and the fourth electrical bus are low voltage DC electrical busses.

Example 6. The system of example 4 or example 5, wherein the inboard nacelle of the plurality of starboard nacelles and the inboard nacelle of the plurality of port nacelles each comprise landing gear.

Example 7. The system of any of examples 1-6, further comprising a vent from the ESS of the outboard nacelle of the first plurality of nacelles to outside the aircraft, and a vent from the ESS of the outboard nacelle of the second plurality of nacelles to outside the aircraft.

Example 8. The system of any of examples 1-7, wherein the outboard nacelle of the first plurality of nacelles further comprises a thermal management system for the ESS of the outboard nacelle of the first plurality of nacelles, and the outboard nacelle of the second plurality of nacelles further comprises a thermal management system for the ESS of the outboard nacelle of the second plurality of nacelles.

Example 9. The system of any of examples 1-8, further comprising an electrical generator configured to supply electrical energy to one or both of the first electrical bus and the second electrical bus.

Example 10. The system of any of examples 1-9, wherein: the ESS of the outboard nacelle of the first plurality of nacelles comprises a plurality of battery modules, a power converter, and a battery management system controller, and the ESS of the outboard nacelle of the second plurality of nacelles comprises a plurality of battery modules, a power converter, and a battery management system controller.

Example 11. The system of any of examples 1-10, wherein the first plurality of nacelles are attached to a first wing of the aircraft on the first side of the aircraft, and the second plurality of nacelles are attached to a second wing of the aircraft on the second side of the aircraft.

Example 12. The system of any of examples 1-11, wherein either the first side of the aircraft is port and the second side is starboard, or the first side of the aircraft is starboard and the second side is port.

Example 13. An airframe comprising the system of any combination of examples 1-12.

Various examples have been described. These and other examples are within the scope of the following claims.

What is claimed is:

1. A system comprising:
a first plurality of nacelles located on a first side of an aircraft, wherein each nacelle of the first plurality of nacelles includes an electric motor coupled to a propulsor, wherein an outboard nacelle of the first plurality of nacelles includes an electrical energy storage system (ESS) coupled to a first electrical bus; and
a second plurality of nacelles located on a second side of the aircraft, wherein each nacelle of the second plurality of nacelles includes an electric motor coupled to a propulsor, wherein an outboard nacelle of the second plurality of nacelles includes an ESS coupled to a second electrical bus;
wherein an electric motor of the outboard nacelle of the first plurality of nacelles and an electric motor of the outboard nacelle of the second plurality of nacelles are configured to operate using electrical energy from the first electrical bus and are not configured to operate using electrical energy from the second electrical bus, and
wherein an electric motor of an inboard nacelle of the first plurality of nacelles and an electric motor of an inboard nacelle of the second plurality of nacelles are configured to operate using electrical energy from the second electrical bus and are not configured to operate using electrical energy from the first electrical bus.

2. The system of claim 1, further comprising a first distribution panel for the first electrical bus located in a fuselage of the aircraft and a second distribution panel for the second electrical bus located in the fuselage.

3. The system of claim 2,
wherein the first electrical bus comprises:
electrical cables connecting the ESS in the outboard nacelle of the first plurality of nacelles to the first distribution panel,
electrical cables connecting the first distribution panel to the electric motor of the outboard nacelle of the first plurality of nacelles, and
electrical cables connecting the first distribution panel to the electric motor of the outboard nacelle of the second plurality of nacelles, and
wherein the second electrical bus comprises:
electrical cables connecting the ESS in the outboard nacelle of the second plurality of nacelles to the second distribution panel,
electrical cables connecting the second distribution panel to the electric motor of the inboard nacelle of the first plurality of nacelles, and
electrical cables connecting the second distribution panel to the electric motor of the inboard nacelle of the second plurality of nacelles.

4. The system of claim 3, wherein the inboard nacelle of the first plurality of nacelles includes a battery connected to a third electrical bus, and the inboard nacelle of the second plurality of nacelles includes a battery connected to fourth electrical bus.

5. The system of claim 4, wherein the first electrical bus and the second electrical bus are high voltage direct current (DC) electrical busses, and wherein the third electrical bus and the fourth electrical bus are low voltage DC electrical busses.

6. The system of claim 4, wherein the inboard nacelle of the plurality of starboard nacelles and the inboard nacelle of the plurality of port nacelles each comprise landing gear.

7. The system of claim 1, further comprising a vent from the ESS of the outboard nacelle of the first plurality of nacelles to outside the aircraft, and a vent from the ESS of the outboard nacelle of the second plurality of nacelles to outside the aircraft.

8. The system of claim 1, wherein the outboard nacelle of the first plurality of nacelles further comprises a thermal management system for the ESS of the outboard nacelle of the first plurality of nacelles, and the outboard nacelle of the second plurality of nacelles further comprises a thermal management system for the ESS of the outboard nacelle of the second plurality of nacelles.

9. The system of claim 1, further comprising an electrical generator configured to supply electrical energy to one or both of the first electrical bus and the second electrical bus.

10. The system of claim 1, wherein:
the ESS of the outboard nacelle of the first plurality of nacelles comprises a plurality of battery modules, a power converter, and a battery management system controller, and
the ESS of the outboard nacelle of the second plurality of nacelles comprises a plurality of battery modules, a power converter, and a battery management system controller.

11. The system of claim 1, wherein the first plurality of nacelles are attached to a first wing of the aircraft on the first side of the aircraft, and the second plurality of nacelles are attached to a second wing of the aircraft on the second side of the aircraft.

12. The system of claim 1, wherein either the first side of the aircraft is port and the second side is starboard, or the first side of the aircraft is starboard and the second side is port.

13. An airframe comprising:
a first plurality of nacelles located on a first side of the airframe, wherein each nacelle of the first plurality of nacelles includes an electric motor coupled to a propulsor, wherein an outboard nacelle of the first plurality of nacelles includes an electrical energy storage system (ESS) coupled to a first electrical bus; and
a second plurality of nacelles located on a second side of the airframe, wherein each nacelle of the second plurality of nacelles includes an electric motor coupled to a propulsor, wherein an outboard nacelle of the second plurality of nacelles includes an ESS coupled to a second electrical bus;
wherein an electric motor of the outboard nacelle of the first plurality of nacelles and an electric motor of the outboard nacelle of the second plurality of nacelles are configured to operate using electrical energy from the first electrical bus and are not configured to operate using electrical energy from the second electrical bus, and
wherein an electric motor of an inboard nacelle of the first plurality of nacelles and an electric motor of an inboard nacelle of the second plurality of nacelles are configured to operate using electrical energy from the second electrical bus and are not configured to operate using electrical energy from the first electrical bus.

14. The airframe of claim 13, further comprising a first distribution panel for the first electrical bus located in a fuselage of the airframe and a second distribution panel for the second electrical bus located in the fuselage.

15. The airframe of claim 14,
wherein the first electrical bus comprises:
electrical cables connecting the ESS in the outboard nacelle of the first plurality of nacelles to the first distribution panel,
electrical cables connecting the first distribution panel to the electric motor of the outboard nacelle of the first plurality of nacelles, and
electrical cables connecting the first distribution panel to the electric motor of the outboard nacelle of the second plurality of nacelles, and
wherein the second electrical bus comprises:
electrical cables connecting the ESS in the outboard nacelle of the second plurality of nacelles to the second distribution panel,
electrical cables connecting the second distribution panel to the electric motor of the inboard nacelle of the first plurality of nacelles, and
electrical cables connecting the second distribution panel to the electric motor of the inboard nacelle of the second plurality of nacelles.

16. The airframe of claim 15, wherein the inboard nacelle of the first plurality of nacelles includes a battery connected to a third electrical bus, and the inboard nacelle of the second plurality of nacelles includes a battery connected to fourth electrical bus.

17. The airframe of claim 16, wherein the first electrical bus and the second electrical bus are high voltage direct current (DC) electrical busses, and wherein the third electrical bus and the fourth electrical bus are low voltage DC electrical busses.

18. The airframe of claim 13, wherein the outboard nacelle of the first plurality of nacelles further comprises a thermal management system for the ESS of the outboard nacelle of the first plurality of nacelles, and the outboard nacelle of the second plurality of nacelles further comprises a thermal management system for the ESS of the outboard nacelle of the second plurality of nacelles.

19. A system comprising: a first plurality of nacelles located on a first side of an aircraft, wherein each nacelle of the first plurality of nacelles includes an electric motor coupled to a propulsor, wherein an outboard nacelle of the first plurality of nacelles includes an electrical energy storage system (ESS) coupled to a first electrical bus; and a second plurality of nacelles located on a second side of the aircraft, wherein each nacelle of the second plurality of nacelles includes an electric motor coupled to a propulsor, wherein an outboard nacelle of the second plurality of nacelles includes an ESS coupled to a second electrical bus; wherein an electric motor of the outboard nacelle of the first plurality of nacelles and an electric motor of the outboard nacelle of the second plurality of nacelles are configured to operate using electrical energy from the first electrical bus and are not configured to operate using electrical energy from the second electrical bus, and wherein an electric motor of an inboard nacelle of the first plurality of nacelles and an electric motor of an inboard nacelle of the second plurality of nacelles are configured to operate only using electrical energy from the second electrical bus and are not configured to operate using electrical energy from the first electrical bus.

20. The system of claim 1, wherein:
cessation of the ESS coupled to the first electrical bus supplying power to the first electrical bus causes the electric motor of the outboard nacelle of the first plurality of nacelles and the electric motor of the outboard nacelle of the second plurality of nacelles to cease propelling the aircraft, and cessation the ESS coupled to the second electrical bus supplying power to the second electrical bus causes the electric motor of the inboard nacelle of the first plurality of nacelles and the electric motor of the inboard nacelle of the second plurality of nacelles to cease propelling the aircraft.

\* \* \* \* \*